US012687515B2

(12) United States Patent
Maki et al.

(10) Patent No.: US 12,687,515 B2
(45) Date of Patent: Jul. 21, 2026

(54) GAS SENSOR AND CASING FOR CONTAINING SENSOR ELEMENT

(71) Applicant: NGK INSULATORS, LTD., Nagoya (JP)

(72) Inventors: Shintaro Maki, Taketoyo-cho (JP); Kota Katagiri, Ginan-cho (JP); Kohei Yaita, Nagoya (JP); Yuya Seike, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 360 days.

(21) Appl. No.: 18/187,041

(22) Filed: Mar. 21, 2023

(65) Prior Publication Data

US 2023/0314365 A1 Oct. 5, 2023

(30) Foreign Application Priority Data

Mar. 30, 2022 (JP) ................................. 2022-056461

(51) Int. Cl.
 *G01N 27/407* (2006.01)
 *G01M 15/10* (2006.01)
 *G01N 27/406* (2006.01)
(52) U.S. Cl.
 CPC ...... *G01N 27/4078* (2013.01); *G01M 15/102* (2013.01); *G01N 27/4062* (2013.01)
(58) Field of Classification Search
 CPC ........... G01N 27/4077; G01N 27/4062; G01N 27/4078; G01N 27/26; G01N 27/403; G01N 27/406; G01N 27/407
 See application file for complete search history.

(56) References Cited

U.S. PATENT DOCUMENTS 6,222,372 B1 * 4/2001 Fukaya ................ G01N 27/407
324/464

FOREIGN PATENT DOCUMENTS

| JP | 2005-227227 A | 8/2005 |
| JP | 2015-227790 A | 12/2015 |
| JP | 2019-184386 A | 10/2019 |

OTHER PUBLICATIONS

Japanese Office Action received in corresponding Japanese Application No. 2022-056461 dated Jul. 29, 2025.

* cited by examiner

*Primary Examiner* — Gurpreet Kaur
(74) *Attorney, Agent, or Firm* — MATTINGLY & MALUR, PC

(57) ABSTRACT

A gas sensor includes: a sensor element including a sensing part on a side of one end portion thereof; a casing; and a connector disposed in the casing to electrically connect the sensor element to an outside, wherein the casing includes: an outer tube including a main portion in which a reference gas is included and a sealing portion being an end portion having a smaller diameter than the main portion, another end portion of the sensor element protruding to the main portion, a rubber seal member fitted into the sealing portion to seal the outer tube, and a spacer intervening between the seal member and the connector in the outer tube. The spacer includes a concave portion in an end surface on a side having contact with the connector, and has contact with the connector in the end surface except for the concave portion.

12 Claims, 6 Drawing Sheets

F I G. 4A
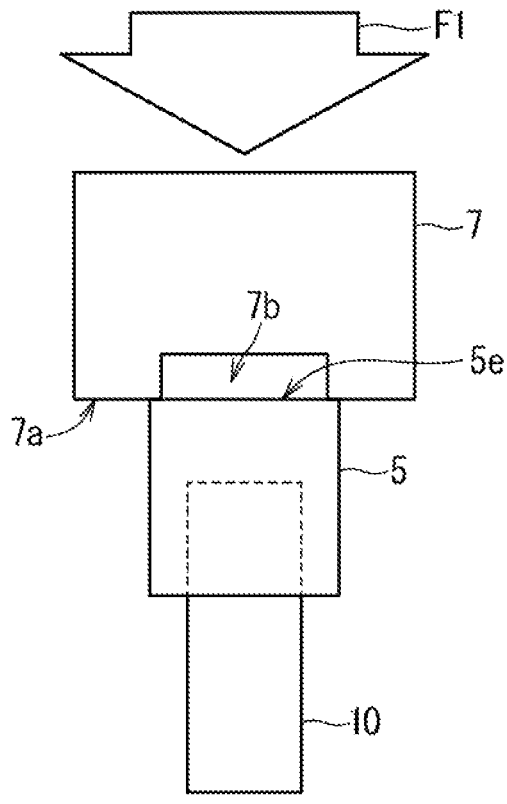
F I G. 4B
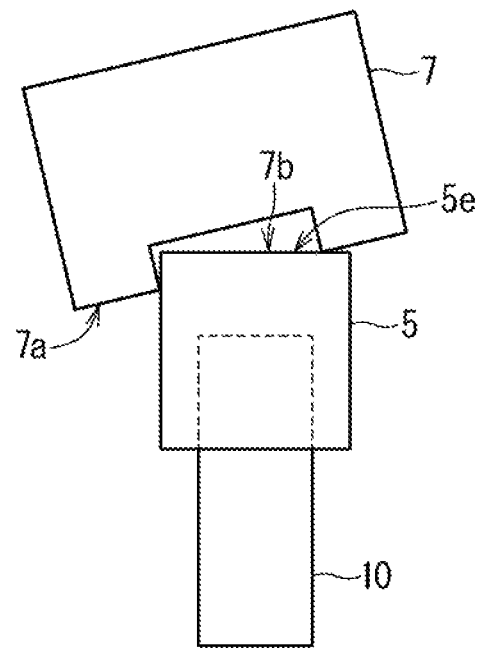

F I G. 5
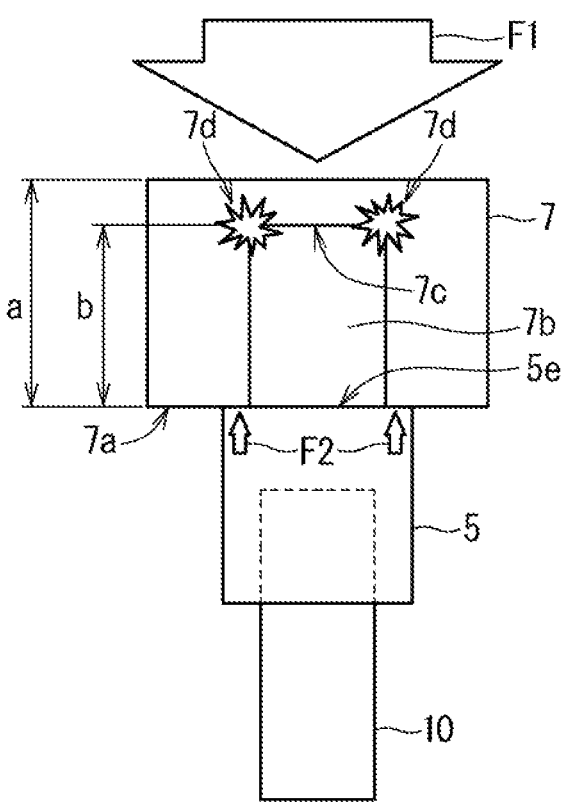

GAS SENSOR AND CASING FOR CONTAINING SENSOR ELEMENT

CROSS-REFERENCE TO RELATED APPLICATION

The present application claims priority from Japanese application JP2022-056461, filed on Mar. 30, 2022, the contents of which is hereby incorporated by reference into this application.

BACKGROUND OF THE INVENTION

Field of the Invention

The present invention relates to a gas sensor and, in particular, to suppression of heat transmission to a seal member sealing a casing for containing a sensor element.

Description of the Background Art

As a device for measuring a concentration of a predetermined gas component in a measurement gas, such as a combustion gas and an exhaust gas from an internal combustion engine typified by an engine of a vehicle, a gas sensor including a sensor element formed of oxygen-ion conductive solid electrolyte ceramics, such as zirconia ($ZrO_2$), has been conventionally known.

As the gas sensor, a gas sensor having a configuration in which an elongated planar sensor element (detection element) including oxygen-ion conductive ceramics (e.g., yttria stabilized zirconia) as a main constituent material thereof is contained in a tubular containment member (casing) made of metal has widely been known. The gas sensor is attached along an exhaust path of the internal combustion engine, and is used to sense the predetermined gas component in the exhaust gas and to measure the concentration thereof.

One end portion of the casing has an opening, and a seal member made of rubber is fit into the opening. A protective cover through which the exhaust gas can enter and exit is attached to the other end portion of the casing. The sensor element is contained in the casing while a portion between the both end portions is sealed to be airtight. This allows one end portion of the sensor element to be in contact with a reference gas (typically, ambient air) in the casing on a side of the one end portion of the casing, and allows the other end portion of the sensor element to be exposed in the protective cover to be in contact with the exhaust gas on a side of the other end portion of the casing in the gas sensor. The reference gas and the exhaust gas are not in contact with each other.

The seal member made of rubber is fit into the opening of the casing after a lead for electrically connecting the sensor element to an outside is inserted into a through hole formed in advance, and the fit portion of the casing is swaged from a side part thereof together with the seal member to prevent ingress of water from outside through the opening.

The sensor element used for the gas sensor typically includes a heater for heating the oxygen-ion conductive ceramics to activate it. Thus, the gas sensor becomes at a high temperature when being in use not only due to heat transferred through piping and heat received from the exhaust gas generated with operation of the internal combustion engine but also due to heat generated by the heater of the gas sensor itself. As the seal member made of rubber, fluororubber, which is highly heat resistant, and the like are thus typically used.

There is a growing demand for shortening (reducing a length) and downsizing of a gas sensor due to a narrowed component attachment space of the internal combustion engine in recent years. When the casing of the conventional gas sensor is shortened to respond to the demand, the seal member made of rubber for closing the opening of the casing is brought close to a heat source, such as piping or the exhaust gas in the piping. A gas sensor intended to deal with such a problem has been commonly known (see Japanese Patent Application Laid-Open No. 2005-227227, for example) In the gas sensor disclosed in Japanese Patent Application Laid-Open No. 2005-227227, a mica insulating member is sandwiched as a spacer between a seal member and a ceramic contact holding member (a separator in Japanese Patent Application Laid-Open No. 2005-227227), thereby suppressing heat transmission to the seal member and prevent excessive increase in temperature of the seal member.

Mica used as a material of the spacer in the gas sensor disclosed in Japanese Patent Application Laid-Open No. 2005-227227 is a substance having a layered structure, thus there is concern about strength. For example, there is concern that a spacer made of mica is partially detached when the gas sensor receives vibration, or productivity is reduced due to breakage of the gas sensor during manufacture.

It is difficult to replace the spacer made of mica with a resin member having a low thermal conductivity similar to mica from a viewpoint of heat resistance.

It is preferable to use a ceramic spacer from a viewpoint of strength and heat resistance, however, a ceramic material falls short of mica in terms of the low thermal conductivity.

SUMMARY

The present invention is directed to a gas sensor and, in particular, relates to suppression of heat transmission to a seal member sealing a casing for containing a sensor element.

According to the present invention, a gas sensor for sensing a predetermined gas component contained in a measurement gas, the gas sensor includes: a sensor element including a sensing part on a side of one end portion thereof; a casing in which the sensor element is contained and secured; and a connector disposed in the casing to electrically connect the sensor element to an outside, wherein the casing includes: an outer tube including a main portion in which a reference gas is included and a sealing portion being an end portion having a smaller diameter than the main portion, another end portion of the sensor element protruding to the main portion, a rubber seal member fitted into the sealing portion to seal the outer tube, and a ceramic spacer intervening between the seal member and the connector in the outer tube. The spacer includes a concave portion in an end surface on a side having contact with the connector, and has contact with the connector in the end surface except for the concave portion.

According to the present invention, heat transmission from the connector to the spacer and further to the seal member can be suppressed. Accordingly, thermal deterioration of the seal member can be suppressed while strength of the spacer is ensured.

Accordingly, an object of the present invention is to provide a gas sensor including a spacer favorably achieving both suppression of increase in temperature of a seal member and ensuring of heat resistance.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A and FIG. 4B are diagrams for explaining a defect which may occur in assembling the gas sensor 100 when a value of a contact portion area ratio S/S0 is small.

FIG. 5 is a diagram for explaining a defect which may occur in assembling the gas sensor 100 when a value of a depth ratio b/a is large.

DESCRIPTION OF THE PREFERRED
EMBODIMENTS

<Configuration of Gas Sensor>

Figure 1:
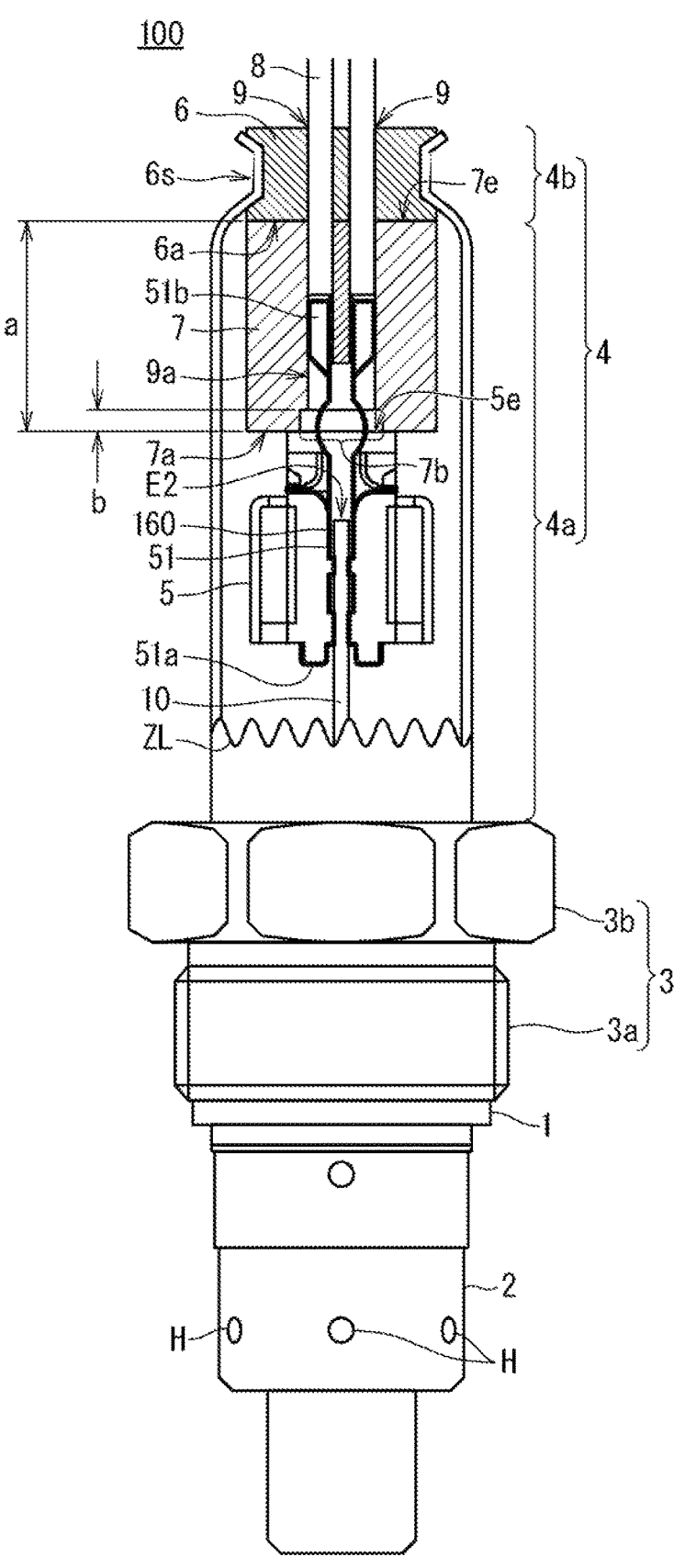
FIG. 1 is a main-part cross-sectional view along a length of a gas sensor 100.

FIG. 1 is a partial cross-sectional view along a length of a gas sensor 100 (more particularly, a main body thereof) according to an embodiment of the present invention. More particularly, a cross-sectional view of the gas sensor 100 is illustrated above a break line ZL, and only appearance of the gas sensor 100 is illustrated below the break line ZL.

The gas sensor 100 is for detecting a predetermined gas component (e.g., NOx) using a sensor element 10 included therein. The gas sensor 100 generally has a configuration in which an elongated columnar or laminar sensor element (detection element) 10 is surrounded by a tubular body 1, a protective cover 2, a securing bolt 3, and an outer tube 4. The tubular body 1, the protective cover 2, and the outer tube 4 as a whole constitute a containment member (casing) for containing the sensor element 10 therein. On the other hand, the securing bolt 3 is fit around an outer side surface of the tubular body 1.

The sensor element 10 is disposed coaxially with the tubular body 1, the protective cover 2, the securing bolt 3, and the outer tube 4. A direction of extension of a central axis of the sensor element 10 is also referred to as an axial direction. In FIG. 1, the axial direction matches an up-down direction in FIG. 1.

More particularly, one end portion (e.g., a first end portion E1 in FIG. 6) of the sensor element 10 is surrounded by the protective cover 2, the other end portion of the sensor element 10 protrudes into the outer tube 4, and a substantially middle portion between the end portions is secured in the tubular body 1 by an unillustrated ceramic green compact or ceramic component while being sealed to be airtight.

The sensor element 10 includes a sensing part (e.g., a gas inlet, an internal chamber, and a sensing electrode) on a side of the one end portion thereof surrounded by the protective cover 2. The sensor element 10 further includes various electrodes and wiring patterns on a surface of and in an element body thereof.

For example, in one aspect of the sensor element 10, a measurement gas introduced into the element is reduced or decomposed in the element to generate oxygen ions. The gas sensor 100 including the sensor element 10 having such a configuration determines the concentration of a gas component to be sensed in the measurement gas based on a quantity of oxygen ions flowing through the element proportional to the concentration of the gas component.

The tubular body 1 is a metal tubular member also referred to as a main metal fitting. The tubular body 1 is barely exposed to an outside of the gas sensor 100, and extends from an upper end portion in FIG. 1 of the protective cover 2 to a lower end portion in FIG. 1 of the outer tube 4. The sensor element 10 and a securing component (the ceramic green compact or the ceramic component) fit around the sensor element 10 are contained in the tubular body 1. In other words, the tubular body 1 is further fit around the fit component, which is fit around the sensor element 10.

The protective cover 2 is a substantially cylindrical exterior member for protecting a predetermined range of the first end portion E1 of the sensor element 10 to be in direct contact with the measurement gas when being in use. The protective cover 2 is secured to a lower end portion in FIG. 1 of the tubular body 1 by welding.

The protective cover 2 has a plurality of through holes H through which gas can pass. The measurement gas flowing into the protective cover 2 through the through holes H is a direct sensing target of the sensor element 10. The types, the numbers, the locations, and the shapes of the through holes illustrated in FIG. 1 are just examples, and may be determined as appropriate in view of flow of measurement gas into the protective cover 2 into consideration.

The securing bolt 3 is an annular member used when the gas sensor 100 is secured to a measurement location. The securing bolt 3 includes a threaded bolt portion 3a and a holding portion 3b held when the bolt portion 3a is engaged. The bolt portion 3a engages with a nut disposed at an attachment location of the gas sensor 100. The gas sensor 100 is thereby secured at the measurement location with a side of the protective cover 2 thereof being in contact with a gas to be measured. For example, the bolt portion 3a engages with a nut portion disposed on an exhaust pipe of a vehicle so that the gas sensor 100 is secured to the exhaust pipe with the side of the protective cover 2 thereof being exposed in the exhaust pipe.

The outer tube 4 is a cylindrical member having one end portion (a lower end portion in FIG. 1) is secured to an outer peripheral end portion of unillustrated upper side of the tubular body 1 by welding. The outer tube 4 includes a main portion 4a extending from a part where the outer tube 4 is secured to the tubular body 1 by welding to have a constant diameter in the axial direction, and a sealing portion 4b contiguous with the main portion 4a in the axial direction. The sealing portion 4b is an end portion having a smaller diameter than the main portion 4a.

An internal space of the outer tube 4 is a reference gas (ambient air) atmosphere. A connector (also referred to as a contact point holding member) 5 and the spacer 7 are disposed in the main portion 4a.

On the other hand, the sealing portion 4b is a portion laterally swaged with the seal member 6 being fit into the sealing portion 4b to seal the other end portion (an upper end portion in FIG. 1) of the outer tube 4.

The outer tube 4 is sealed by swaging an entire circumference of the sealing portion 4b from outside in a swaging portion 6s lateral to the seal member 6 in FIG. 1 so that the seal member 6 generates radially outward reaction force.

The seal member 6 is made of rubber. Thus, the seal member 6 is also referred to as a rubber plug. The rubber to be used is typically fluororubber. The seal member 6 has a uniform cylindrical shape before being fitted into the sealing portion 4*b*, but is deformed in a radial direction by fitting and swaging.

The other end portion (e.g., a second end portion E2 in FIG. 6) of the sensor element 10 is inserted into the connector 5. The connector 5 includes a plurality of contact point members 51 made of metal to be in contact with a plurality of electrode terminals 160 (see FIG. 6) of the sensor element 10 when the sensor element 10 is inserted. One end portion (a lower end portion in FIG. 1) of each of the contact point members 51 is a hooked portion 51*a* hooked to the connector 5, the other end portion (an upper end portion in FIG. 1) of each of the contact point members 51 is a crimping portion 51*b* to which a lead 8 is secured by crimping, and a portion between the end portions is a leaf spring portion. The contact point members 51 are secured by being sandwiched between the connector 5 and the sensor element 10, so that the electrode terminals 160 of the sensor element 10 and the contact point members 51 are electrically connected.

The spacer 7 is sandwiched (intervenes) between the connector 5 and the seal member 6 in the outer tube 4. The spacer 7 has a cylindrical shape with substantially the same diameter as the seal member 6 before swaging. The spacer 7 is provided to suppress increase in temperature of the seal member 6 in using the gas sensor 100. Details of the spacer 7 will be described later.

Each of leads 8 is inserted into through holes 9 sequentially provided in the seal member 6 and the spacer 7, and has one end portion secured to the crimping portion 51*b* of the contact point member 51 by crimping and the other end portion connected to a controller 50 and various power supplies (see FIG. 6) outside the gas sensor 100. The sensor element 10 is thereby electrically connected to the controller 50 and the various power supplies through the contact point members 51 and the leads 8. While only two contact point members 51 and two leads 8 are illustrated in FIG. 1, they are for ease of illustration, and the required number of leads for electrical connection described above are actually provided.

The gas sensor 100 having the above configuration can be manufactured by a method similar to a conventional method. Schematically, prior to swaging at the swaging portion 6*s*, the connector 5 into which the sensor element 10 has been inserted and in which the contact point members 51 have been connected to the leads 8 is disposed in the main portion 4*a* of the outer tube 4 in advance. Subsequently, the spacer 7 and the seal member 6 are then stacked on the connector 5 in this order while the leads 8 are inserted into the through holes 9 therein. The seal member 6 into which the leads 8 are inserted is fitted into the sealing portion 4*b* before swaging. Typically, ambient air as the reference gas has already entered the outer tube 4 before the seal member 6 is fit into sealing portion 4*b*. The swaging portion 6*s* is swaged by a predetermined swaging means after the seal member 6 is fitted.

It is a favorable example to swage the swaging portion 6*s* continuously extending over the outer periphery of sealing portion 4*b*, however, the swaging portion 6*s* may discontinuously extend in a circumferential direction of sealing portion 4*b* as long as a favorable swaging securing is achieved.

<Configuration and Function Effect of Spacer>

Described in detail next are a configuration of the spacer 7 and a function effect obtained by including the configuration thereof.

Firstly, ceramics is selected as a material of the spacer 7 from a viewpoint of ensuring strength. Preferably selected is ceramics having a thermal conductivity of 32 W/m·K or less, which is suitable from a viewpoint of heat resistance and a low heat transmission property. More preferably, alumina (thermal conductivity: 32 W/m·K) or steatite (thermal conductivity: 2 W/m·K) is selected.

Figure 2:
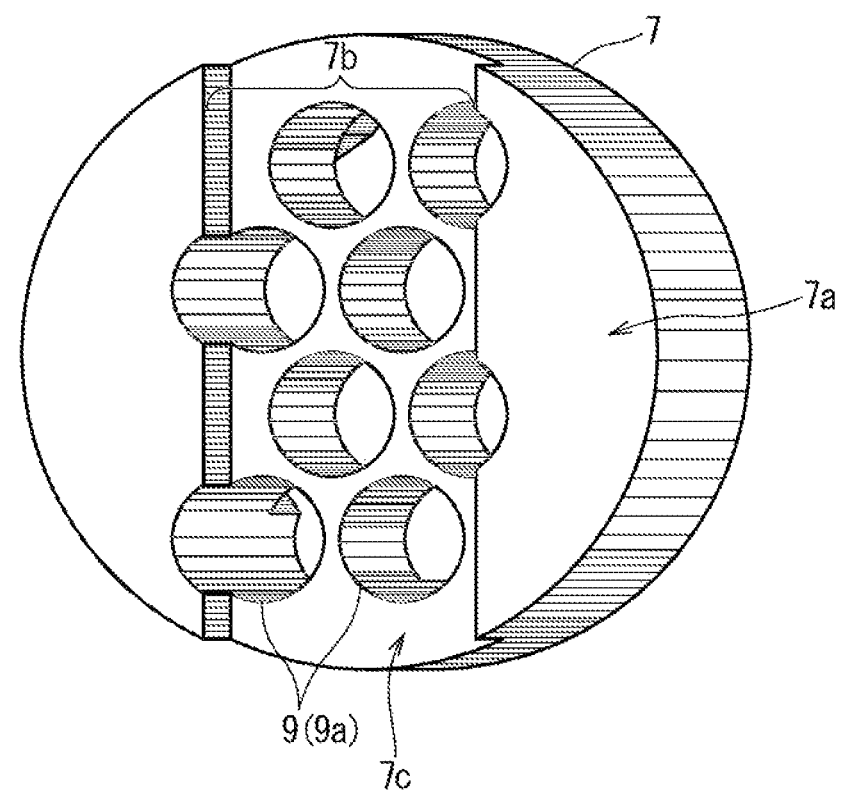
FIG. 2 is a schematic perspective view of a spacer 7 illustrating an example of forming a concave portion 7b.

In addition, in the present embodiment, a concave portion 7*b* is provided on a side of one end surface 7*a* of the spacer 7. FIG. 2 is a schematic perspective view of the spacer 7 illustrating an example of forming the concave portion 7*b*. FIG. 2 exemplifies a case where the concave portion 7*b* is provided as a linear groove portion having a flat bottom surface 7*c* and having a rectangular cross section perpendicular to a longitudinal direction. In FIG. 2, four of eight through holes 9 (9*a*) included in the spacer 7 are located in a portion of a level difference between one end surface 7*a* and the concave portion 7*b*, however, it is exemplification, thus an arrangement of the through holes 9*a* is not limited thereto.

Figure 3A:
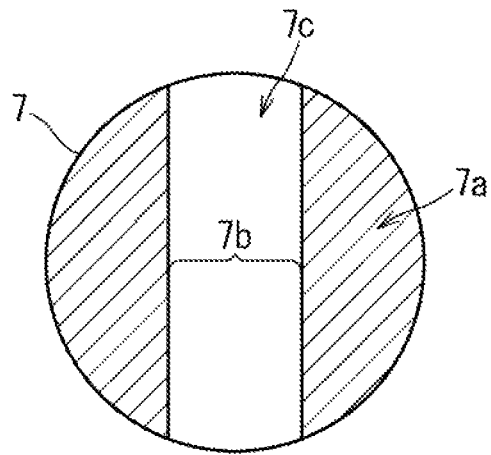
FIG. 3A, FIG. 3B, and FIG. 3C are plan views exemplifying various shapes of the concave portion 7b.
Figure 3B:
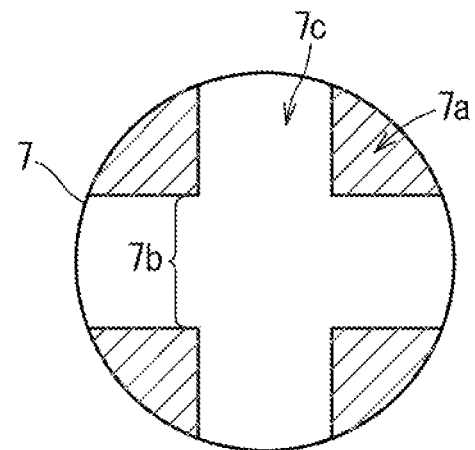
Figure 3C:
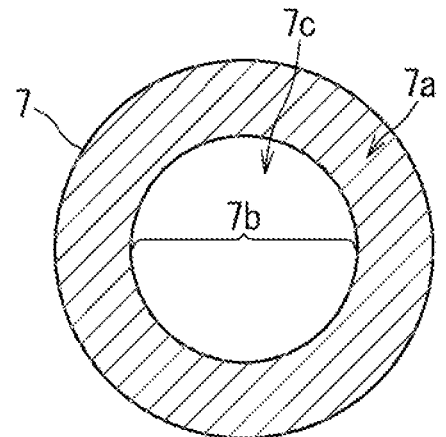

FIG. 3A to FIG. 3C are plan views exemplifying various shapes of the concave portion 7*b*. However, the illustration of the through holes 9*a* is omitted.

FIG. 3A illustrates a case where the concave portion 7*b* is a linear groove portion in the manner similar to FIG. 2. In the meanwhile, FIG. 3B illustrates a concave portion 7*b* having a cross-like shape made up of such linear groove portions perpendicular to each other in a plan view. FIG. 3C illustrates the concave portion 7*b* having a circular shape in a plan view. A bottom surface 7*c* of these concave portions 7*b* may be flat, or may also have a curved surface.

In any case of the shape of the spacer 7, as illustrated in FIG. 1, the connector 5 has contact with the spacer 7 in a portion of one end surface 7*a* except for the concave portion 7*b*, and does not have contact with the spacer 7 in the concave portion 7*b*.

By adopting such a configuration, in the gas sensor 100 according to the present embodiment, heat transmission from the connector 5 to the spacer 7 and further to the seal member 6 is suppressed compared with the gas sensor 100 having a configuration that the whole connector 5 has contact with one end surface 7*a* of the spacer 7. That is to say, risk of thermal deterioration of the seal member 6 is reduced. Specifically, in a case of a structure that the connector 5 and the seal member 6 have direct contact with each other, there may be a case where the seal member 6 is thermally decomposed from a portion having contact with the connector 5 as a starting point, and emitted gas is diffused and signal abnormality occurs, however, in the gas sensor 100 according to the present embodiment, the spacer 7 having the concave portion 7*b* intervenes, thus increase in temperature of the end surface of the seal member 6 is suppressed, and as a result, risk of occurrence of signal abnormality by the thermal decomposition is favorably reduced.

The shape of the concave portion 7*b* is not limited thereto illustrated in FIG. 3A to FIG. 3C, however, the other shape may be adopted as long as the spacer 7 is favorably held between the connector 5 and the seal member 6 and moreover, heat transmission from the connector 5 to the seal member 6 is favorably suppressed.

It is preferable that when a smaller one of an area of an end surface 5*e* of the connector 5 being a contact surface having contact with the spacer 7 and an area of the whole one end surface 7*a* including the concave portion 7*b* of the spacer 7 is S0, and a contact area between the connector 5 and the spacer 7 is S, heat transmission from the connector 5 to the spacer 7 and further to the seal member 6 tends to be suppressed as a value of a ratio therebetween (also referred to as a contact portion area ratio hereinafter) S/S0 gets smaller. The area S0 is alternative because it is considered that FIG. 1 exemplifies a case where the area of the whole one end surface 7a of the spacer 7 is larger than the area of the end surface 5e of the connector 5, however, also applicable is a configuration that a magnitude relationship of the area thereof is reversed.

Heat transmission from the connector 5 to the spacer 7 and further to the seal member 6 tends to be suppressed as a ratio (also referred as a depth ratio hereinafter) b/a of a depth b of the concave portion 7b to a height a of the spacer 7 gets larger. In the case that the bottom surface 7c of the concave portion 7b is not flat, a distance to a deepest position may be defined as the depth b.

Originally, heat transmission reduction effect should be developed as long as S/S0<1 or b/a>0 is satisfied, however, a substantial heat transmission reduction effect is practically expected in the case that S/S0≤0.7 or b/a≥0.08 is satisfied. For example, when the spacer 7 is made of steatite and S/S0≤0.5 and b/a≥0.15 are satisfied, an effect of reducing the temperature in the contact portion 6a of the seal member 6 having contact with the spacer 7 by at least approximately 2% is obtained compared with a case where the concave portion 7b is not provided. Particularly, the temperature reduction effect in a case where S/S0≤0.5 and b/a≥0.5 are satisfied is approximately 3%. According to the latter case, when a thermal resistance limit temperature of the seal member 6 is 300° C., the temperature reduction effect of at least 10° C. can be expected.

However, it is preferable to satisfy S/S0≥0.2. FIG. 4A and FIG. 4B are diagrams for explaining a defect which may occur in assembling the gas sensor 100 when a value of the contact portion area ratio S/S0 is small. In assembling the gas sensor 100, the seal member 6 fitted into sealing portion 4b of outer tube 4 is allowed to abut on the other end surface (a surface opposite to one end surface 7a) 7e of the spacer 7 while the spacer 7 abuts on the end surface 5e of the connector 5 in which the sensor element 10 is inserted into a side of the other end portion. Subsequently, the sealing portion 4b is laterally swaged and reduced in diameter at the swaging portion 6s, thus the seal member 6 is deformed. A downward load F1 acts on the spacer 7 as illustrated in FIG. 4A in accordance with the deformation of the seal member 6.

At this time, upper and lower end surfaces of the spacer 7 are restrained by the seal member 6 and the connector 5, however, an outer periphery is not particularly restrained. Thus, when the value of S/S0 is small, there may be occurrence of a defect that the spacer 7 is inclined as illustrated in FIG. 4B depending on the action of the load F1, and is not correctly held between the seal member 6 and the connector 5, and furthermore a defect that sensor element 10 gets broken due to application of force to the sensor element 10 from a side surface. In a case of S/S0<0.2, such defects significantly occur.

It is preferable to satisfy b/a≤0.6. FIG. 5 is a diagram for explaining a defect which may occur in assembling the gas sensor 100 when a value of the depth ratio b/a is large.

As described above, the downward load F1 acts on the spacer 7 in accordance with the swaging deformation of the sealing portion 4b of the outer tube 4 in assembling the gas sensor 100. At that time, an upward load F2 also acts on the spacer 7 from the connector 5. That is to say, compression force acts on the spacer 7 from both up and down directions. Thus, when the value of b/a is large and the concave portion 7b is deep, collapse failure may occur near an end edge portion 7d of the bottom surface 7c. In a case of b/a>0.6, such a defect significantly occurs.

As described above, according to the present embodiment, the ceramic spacer intervenes between the connector disposed inside the outer tube of the gas sensor to be connected to the sensor element and the seal member sealing the end portion of the outer tube, and the concave portion is provided in the portion of the spacer having contact with the connector, thus heat transmission from the connector to the spacer and further to the seal member can be suppressed. Accordingly, thermal deterioration of the seal member can be suppressed while strength of the spacer is ensured.

<Example of Configuration of Sensor Element>

Figure 6:
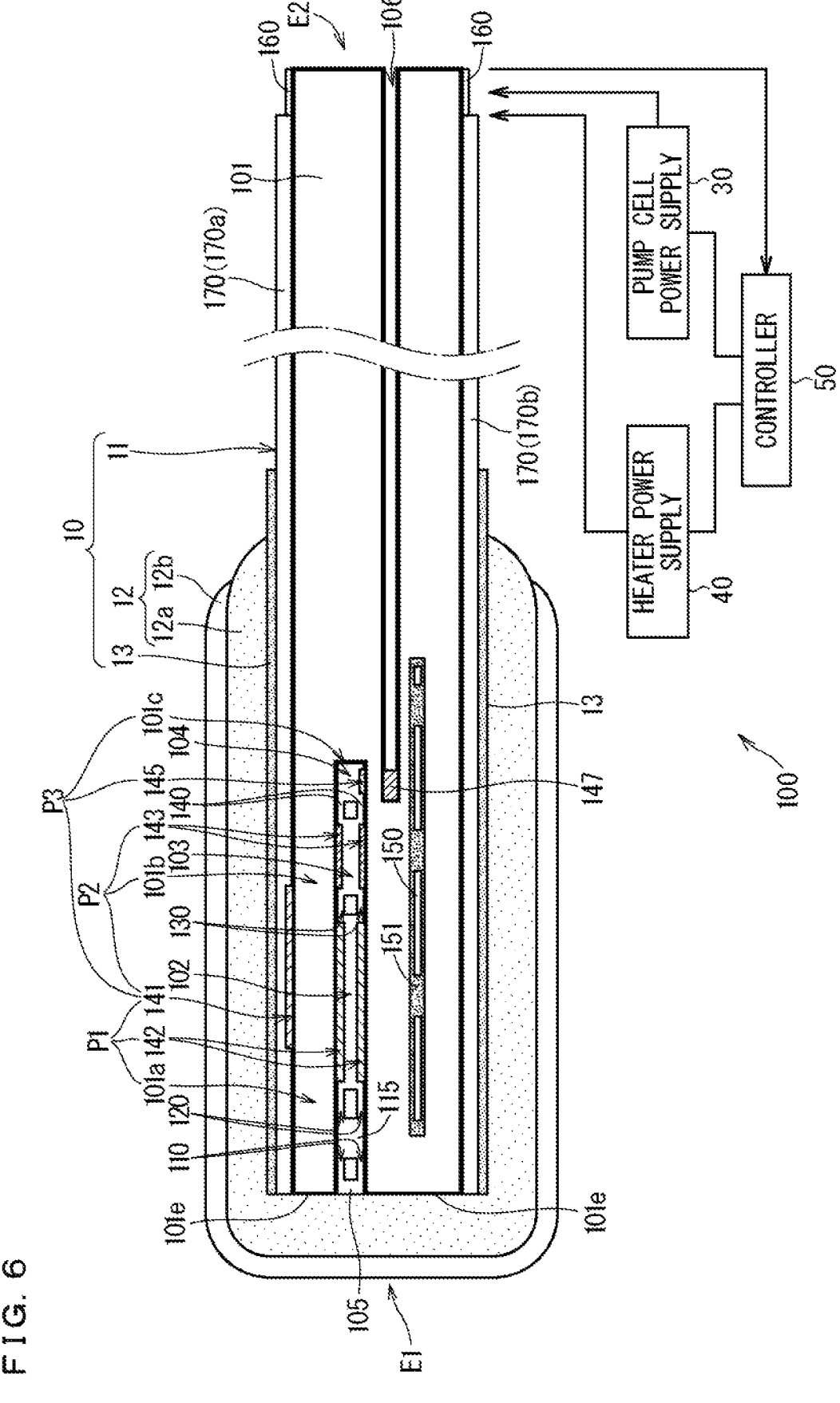
FIG. 6 is a cross-sectional view along the length of a sensor element 10 for detecting NOx.

A configuration of the sensor element 10 for detecting NOx as an example of the sensor element 10 will finally be described. FIG. 6 is a cross-sectional view along the length of the sensor element 10 for detecting NOx. In this case, the sensor element 10 is a so-called limiting current type gas sensor element. FIG. 6 illustrates a pump cell power supply 30, a heater power supply 40, and the controller 50 of the gas sensor 100 in addition to the sensor element 10.

As illustrated in FIG. 6, the sensor element 10 generally has a configuration that a portion of an elongated planar element base 11 on the side of the first end portion E1 is covered with a porous leading-end protective layer 12. The element base 11 includes an elongated planar ceramic body 101 as a main structure, and main-surface protective layers 170 (170a and 170b) are arranged on two main surfaces of the ceramic body 101. Furthermore, in the sensor element 10, the leading-end protective layer 12 (an inner leading-end protective layer 12a and an outer leading-end protective layer 12b) is disposed outside an end surface (a leading end surface 101e of the ceramic body 101) and four side surfaces on a side of one leading end portion.

In the present embodiment, end portions of the ceramic body 101 and the sensor element 10 on the side of the first end portion E1 of the element base 11 are also referred to as first end portions E1, and end portions of the ceramic body 101 and the sensor element 10 on a side of the second end portion E2 of the element base 11 are also referred to as second end portions E2 for the sake of convenience.

The ceramic body 101 is made of ceramics including, as a main component, zirconia (yttrium stabilized zirconia), which is an oxygen-ion conductive solid electrolyte. The ceramic body 101 is dense and airtight.

The sensor element 10 illustrated in FIG. 6 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on the side of the first end portion E1 of the ceramic body 101 (to be precise, communicating with the outside through the leading-end protective layer 12), the second internal chamber 103 communicates with the first internal chamber 102 through a third diffusion control part 130, and the third internal chamber 104 communicates with the second internal chamber 103 through a fourth diffusion control part 140, in outline. A path from the gas inlet 105 to the third internal chamber 104 is also referred to as a gas distribution part. In the sensor element 10 according to the present embodiment, the distribution part is provided straight along the longitudinal of the ceramic body 101.

The first diffusion control part 110, the second diffusion control part 120, the third diffusion control part 130, and the fourth diffusion control part 140 are each provided as two slits vertically arranged in FIG. 6. The first diffusion control part 110, the second diffusion control part 120, the third diffusion control part 130, and the fourth diffusion control part 140 provide predetermined diffusion resistance to the measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 as the sensing part for directly sensing a gas component to be measured is provided in the third internal chamber 104. In addition, a reference gas inlet 106 which communicates with the outside and through which the reference gas is introduced is provided on the side of the second end portion E2 of the ceramic body 101, and a reference electrode 147 is provided in the reference gas inlet 106.

In the gas sensor 100 including the sensor element 10, the concentration of a NOx gas in the measurement gas is calculated by a process as described below.

First, the measurement gas flowing into the protective cover 2 through the through holes H and introduced into the first internal chamber 102 through the gas inlet 105 is adjusted to have an approximately constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101a that is a portion of the ceramic body 101 present between these electrodes. In the second internal chamber 103, oxygen in the measurement gas is pumped out of the element by a pumping action of an auxiliary pump cell P2, which is also an electrochemical pump cell, so that the measurement gas is in a sufficiently low oxygen partial pressure state. The auxiliary pump cell P2 includes the outer pump electrode 141, the auxiliary pump electrode 143, and a ceramic layer 101b that is a portion of the ceramic body 101 present between these electrodes.

The external pump electrode 141, the internal pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx present in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of unillustrated electrochemical sensor cells sensing the potential difference between each pump electrode and the reference electrode 147, and each pump cell is controlled by the controller 50 based on a detected signal in each sensor cell.

In the sensor element 10, the heater 150 is buried in the ceramic body 101. The heater 150 is provided, below the gas distribution part in FIG. 6, over a range from the vicinity of the first end portion E1 to at least a location of formation of the measurement electrode 145 and the reference electrode 147. The heater 150 generates heat by being powered from the heater power supply 40 under control performed by the controller 50. The heater 150 is provided mainly to heat the sensor element 10 to enhance oxygen-ion conductivity of the solid electrolyte forming the ceramic body 101 when the sensor element 10 is in use. The sensor element 10 is heated so that the temperature at least in a range from the first internal chamber 102 to the second internal chamber 103 becomes 500° C. or more.

More specifically, the heater 150 is a resistance heating body made, for example, of platinum, and is provided to be surrounded by an insulating layer 151.

The plurality of electrode terminals 160 are formed on the respective main surfaces of the ceramic body 101 on the side of the second end portion E2 to establish electrical connection between the sensor element 10 and the outside. These electrode terminals 160 are electrically connected to the above-mentioned five electrodes, opposite ends of the heater 150, and unillustrated internal wiring for detecting heater resistance through unillustrated internal wiring provided within the ceramic body 101 to have a predetermined correspondence relationship. As described above, the electrode terminals 160 are connected to the leads 8 via the contact point members 51, and application of a voltage from the pump cell power supply 30 to each pump cell of the sensor element 10 and heating using the heater 150 by being powered from the heater power supply 40 are thus performed through the leads 8, the contact point members 51, and the electrode terminals 160.

The main-surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces of the ceramic body 101 and the outer pump electrode 141. The main-surface protective layer 170a thus functions as a pump electrode protective layer for protecting the outer pump electrode 141.

The leading-end protective layer 12 is provided around an outermost periphery of the element base 11 in a predetermined range from the first end portion E1. The leading-end protective layer 12 is provided in a manner of surrounding a portion of the element base 11 in which the temperature is high (up to approximately 700° C. to 800° C.) when the gas sensor 100 is in use, in order to ensure water resistance in the portion to thereby suppress the occurrence of cracking (water-induced breakage) of the element base 11 due to thermal shock caused by local temperature reduction upon direct exposure of the portion to water.

In addition, the leading-end protective layer 12 is also provided to ensure poisoning resistance to prevent poisoning substance such as Mg from entering into the sensor element 10.

The inner leading-end protective layer 12a is made of alumina, has a porosity of 45% to 60%, and has a thickness of 450 μm to 650 μm. The outer leading-end protective layer 12b is made of alumina, has a porosity of 10% to 40%, which is lower than the porosity of the inner leading-end protective layer 12a, and has a thickness of 50 μm to 300 μm. The inner leading-end protective layer 12a is provided as a low-thermal conductivity layer to have a function of suppressing thermal conduction from the outside to the element base 11.

The inner leading-end protective layer 12a and the outer leading-end protective layer 12b are formed by sequentially thermal spraying (plasma-spraying) constituent materials with respect to the element base 11 having a surface on which an underlying layer 13 has been formed.

As illustrated in FIG. 6, the underlying layer 13 is provided between the inner leading-end protective layer 12a and the element base 11 to secure an adhesion of the inner leading-end protective layer 12a. The underlying layer 13 is provided at least on the two main surfaces of the element base 11. The underlying layer 13 is made of alumina, has a porosity of 30% to 60%, and has a thickness of 15 μm to 50 μm.

<Modification>

While the limiting current type sensor element having three internal chambers and detecting NOx as a gas component to be detected is shown as an example of the sensor element 10 in the above-mentioned embodiment, the number of internal chambers may not be three and a gas component other than NOx may be detected in the sensor element 10 of the gas sensor 100. Alternatively, the sensor element may be a sensor element having no internal chambers, such as a mixed potential type sensor element.

[Example]

Simulation was performed by CAE on a temperature (steady temperature) in the contact portion 6a of the seal member 6 having contact with the spacer 7 in a case where the gas sensor 100 including the seal member 6 made up of fluororubber and the spacer 7 made up of steatite was attached to piping through which high-temperature measurement gas flowed, and then a temperature reduction effect by the spacer 7 was determined.

A temperature of the gas flowing in the piping was set to 850° C., and a flow rate was set to 4.85 m/sec. The gas sensor 100 was attached to the piping by making the bolt 3a engage with a nut provided in a predetermined attachment location. A temperature outside the piping (temperature around the gas sensor 100) was set to 25° C. A drive temperature of the sensor element 10 (setting heating temperature in the heater 150) was set to 850° C.

Used was the gas sensor 100 in which the area of the whole one end surface 7a of the spacer 7 including the concave portion 7b was larger than the area of the end surface 5e of the connector 5 and the concave portion 7b of the spacer 7 constituted the linear groove portion illustrated in FIG. 2 and FIG. 3A, however, a value of the depth ratio b/a differed in two levels (Example 1 and Example 2). Specifically, the value thereof differed in two levels of 0.15 (Example 1) and 0.5 (Example 2). A contact portion area ratio S/S0 was 0.459 in common.

Simulation was also performed on the gas sensor 100 having the configuration similar to Example 1 and Example 2 except that the concave portion 7b is not included in the same condition, as a comparative example for obtaining a reference of the steady temperature.

Table 1 shows about Example 1 and Example 2, as a list, a contact portion area ratio S/S0 and a depth ratio b/a (these ratios are also shown in Comparative Example 1), a determination result of the temperature reduction effect based on a maximum temperature of the contact portion 6a, and a ratio of a temperature of the contact portion 6a in a case where a value in Comparative Example 1 is set to 1.

TABLE 1

| | Contact portion area ratio S/S0 | Depth ratio in concave portion b/a | Determination result | Temperature ratio in seal member |
|---|---|---|---|---|
| Comparative Example 1 | 1 | 0 | — | 1 |
| Example 1 | 0.459 | 0.15 | Δ | 0.978 |
| Example 2 | 0.459 | 0.5 | ◯ | 0.967 |

In determining the temperature reduction effect, it is determined that the temperature reduction effect of the seal member 6 is favorably obtained by providing the concave portion 7b in the spacer 7 when the contact portion 6a of the gas sensor 100 has a temperature lower than that in Comparative Example 1 by 6° C. or more. A circle mark is assigned to the determination result column in Table 1 in Example 2 falling under the above condition.

In the meanwhile, it is determined that the temperature reduction effect of the seal member 6 is obtained to a certain degree by providing the concave portion 7b in the spacer 7 when the contact portion 6a of the gas sensor 100 has a temperature lower than that in Comparative Example 1 by 1° C. or more and smaller than 6° C. A triangle mark is assigned to the determination result column in Table 1 in Example 1 falling under the above condition.

It is determined that the temperature reduction effect of the seal member 6 is not obtained by providing the concave portion 7b in the spacer 7 when the contact portion 6a has a temperature lower than that in Comparative Example 1 by less than 1° C. or equal to or higher than that in Comparative Example 1, however, any of the gas sensors 100 in Example 1 and Example 2 does not fall under this condition.

Confirmed from the result shown in Table 1 is that the temperature reduction effect of 2% or more in the contact portion 6a of the seal member 6 having contact with the spacer 7 is obtained in the gas sensor 100 according to Example 1 including the concave portion 7*b* satisfying $0.2 \leq S/S0 \leq 0.5$ and $0.15 \leq b/a \leq 0.6$. Furthermore, it is confirmed that the temperature reduction effect of 3% or more in the contact portion 6*a* of the seal member 6 having contact with the spacer 7 is obtained in the gas sensor 100 according to Example 2 including the concave portion 7*b* satisfying $0.2 \leq S/S0 \leq 0.5$ and $0.5 \leq b/a \leq 0.6$.

While the invention has been shown and described in detail, the foregoing description is in all aspects illustrative and not restrictive. It is therefore understood that numerous modifications and variations can be devised without departing from the scope of the invention.

What is claimed is:

1. A gas sensor for sensing a predetermined gas component contained in a measurement gas, the gas sensor comprising:

a sensor element including a sensing part on a side of one end portion thereof;

a casing in which the sensor element is contained and secured; and a connector disposed in the casing to electrically connect the sensor element to an outside, wherein the casing includes:

an outer tube including a main portion in which a reference gas is included and a sealing portion being an end portion having a smaller diameter than the main portion, another end portion of the sensor element protruding to the main portion, a rubber seal member fitted into the sealing portion to seal the outer tube, and a ceramic spacer intervening between the seal member and the connector in the outer tube, the ceramic spacer includes a concave portion in an end surface on a side having contact with the connector, and has contact with the connector in the end surface except for the concave portion, and when a smaller one of an area of a contact surface of the connector having contact with the ceramic spacer and an area of the whole end surface including the concave portion of the ceramic spacer is S0, and a contact area between the connector and the ceramic spacer is S. satisfied for a contact portion area ratio S/S0 is:

$$0.2 \leq S/S0 \leq 0.7.$$

2. The gas sensor according to claim 1, wherein when a height of the ceramic spacer is a and a depth of the concave portion is b, satisfied for a depth ratio b/a is:

$$0.08 \leq b/a \leq 0.6.$$

3. The gas sensor according to claim 1, wherein the concave portion has a linear shape, a cross-like shape, or a circular shape in a plan view from a side of the end surface of the ceramic spacer.

4. The gas sensor according to claim 1, wherein a thermal conductivity of the ceramic spacer is equal to or smaller than 32 W/m·K.

5. A sensor element containment casing for containing a sensor element and a connector while securing the sensor element therein, the sensor element including, on a side of one end portion thereof, a sensing part for sensing a predetermined gas component contained in a measurement gas, the connector electrically connecting the sensor element to an outside, the sensor element containment casing comprising:

an outer tube including a main portion in which a reference gas is included and a sealing portion being an end portion having a smaller diameter than the main portion, another end portion of the sensor element protruding to the main portion;

a rubber seal member fitted into the sealing portion to seal the outer tube; and a ceramic spacer intervening between the seal member and the connector in the outer tube, wherein the ceramic spacer includes a concave portion in an end surface on a side having contact with the connector, and has contact with the connector in the end surface except for the concave portion, and when a smaller one of an area of a contact surface of the connector having contact with the ceramic spacer and an area of the whole end surface including the concave portion of the spacer is S0, and a contact area between the connector and the ceramic spacer is S. satisfied for a contact portion area ratio S/S0 is:

$$0.2 \leq S/S0 \leq 0.7.$$

6. The sensor element containment casing according to claim 5, wherein when a height of the ceramic spacer is a and a depth of the concave portion is b, satisfied for a depth ratio b/a is:

$$0.08 \leq b/a \leq 0.6.$$

7. The sensor element containment casing according to claim 5, wherein the concave portion has a linear shape, a cross-like shape, or a circular shape in a plan view from a side of the end surface of the ceramic spacer.

8. The sensor element containment casing according to claim 5, wherein a thermal conductivity of the ceramic spacer is equal to or smaller than 32 W/m·K.

9. The gas sensor according to claim 2, wherein the concave portion has a linear shape, a cross-like shape, or a circular shape in a plan view from a side of the end surface of the ceramic spacer.

10. The gas sensor according to claim 2, wherein a thermal conductivity of the ceramic spacer is equal to or smaller than 32 W/m·K.

11. The sensor element containment casing according to claim 6, wherein the concave portion has a linear shape, a cross-like shape, or a circular shape in a plan view from a side of the end surface of the ceramic spacer.

12. The sensor element containment casing according to claim 6, wherein a thermal conductivity of the ceramic spacer is equal to or smaller than 32 W/m·K.

* * * * *